(12) United States Patent
Canberi

(10) Patent No.: US 11,550,303 B2
(45) Date of Patent: Jan. 10, 2023

(54) ROBOTIC PRODUCTION LINE AND METHODS OF FLEXIBLE AND CHAOTIC PRODUCTION

(71) Applicant: ROBOTEK OTOMASYON TEKNOLOJILERI SANAYI TICARET LIMITED SIRKETI, Kocaeli (TR)

(72) Inventor: Osman Canberi, Kocaeli (TR)

(*) Notice: Subject to any disclaimer, the term of this patent is extended or adjusted under 35 U.S.C. 154(b) by 220 days.

(21) Appl. No.: 16/473,055

(22) PCT Filed: Jan. 2, 2017

(86) PCT No.: PCT/TR2017/050002
§ 371 (c)(1),
(2) Date: Jun. 24, 2019

(87) PCT Pub. No.: WO2018/125007
PCT Pub. Date: Jul. 5, 2018

(65) Prior Publication Data
US 2019/0332097 A1   Oct. 31, 2019

(51) Int. Cl.
*B25J 9/00* (2006.01)
*B25J 5/02* (2006.01)
*G05B 19/418* (2006.01)

(52) U.S. Cl.
CPC ............ *G05B 19/4182* (2013.01); *B25J 5/02* (2013.01); *B25J 9/0084* (2013.01); *B25J 9/0093* (2013.01);
(Continued)

(58) Field of Classification Search
CPC . B25J 9/0093; B25J 5/02; B25J 9/0084; B25J 9/162; B25J 5/007; G05B 19/4182;
(Continued)

(56) References Cited

U.S. PATENT DOCUMENTS

| 4,667,403 | A | * | 5/1987 | Edinger | ............... H05K 13/084 |
| | | | | | 29/840 |
| 5,314,055 | A | * | 5/1994 | Gordon | ............ G05B 19/4182 |
| | | | | | 198/395 |

(Continued)

FOREIGN PATENT DOCUMENTS

| CN | 105922082 A | * | 9/2016 | ......... B23Q 11/0089 |
| DE | 3543209 A1 | * | 6/1987 | ............ B23Q 7/046 |

(Continued)

OTHER PUBLICATIONS

Robotek, "Fully Automated Robotic Cell for Polyurethane Glue Dispensing", Jun. 23, 2014 (Jun. 23, 2014), retreived from YouTube on Apr. 14, 2021, https://youtu.be/5iUldl2ocWs (Year: 2014).*

(Continued)

*Primary Examiner* — Khoi H Tran
*Assistant Examiner* — Tanner L Cullen
(74) *Attorney, Agent, or Firm* — Egbert, McDaniel & Swartz, PLLC

(57) ABSTRACT

A robotic production line assembly has a recipe programmed in order to process a workpiece, an articulated robot having the recipe assigned thereto, an end effector attached to a wrist of the robot, a feeding system that transfers the workpiece, an unloading system that unloads the workpiece from a process conveyor, a plurality of working stations cooperative with the robot, a workpiece identification system, a robotic controller and a system controller. The robotic production line is compact and is capable of flexible and chaotic production.

7 Claims, 11 Drawing Sheets

(52) U.S. Cl.
CPC ... *G05B 19/4183* (2013.01); *G05B 19/41805* (2013.01); *G05B 19/41875* (2013.01)

(58) Field of Classification Search
CPC .... G05B 2219/39102; G05B 19/41805; G05B 19/4183; G05B 19/41875; G05B 19/41815; G05B 2219/31044; B65B 59/00; B23P 21/00; B65G 47/52; Y02P 90/02
See application file for complete search history.

(56) References Cited

U.S. PATENT DOCUMENTS

| | | | |
|---|---|---|---|
| 5,321,885 A | 6/1994 | Hino et al. | |
| 2001/0049923 A1 | 12/2001 | Huppi et al. | |
| 2004/0167647 A1 | 8/2004 | Ghuma et al. | |
| 2006/0091842 A1* | 5/2006 | Nishiyama | G05B 19/4183 318/568.11 |
| 2011/0130859 A1* | 6/2011 | Habisreitinger | B25J 9/0093 700/112 |
| 2017/0121113 A1* | 5/2017 | Wagner | B25J 9/0093 |
| 2017/0157648 A1* | 6/2017 | Wagner | B25J 9/1694 |
| 2017/0341221 A1* | 11/2017 | Hashimoto | B25J 9/0093 |
| 2018/0169690 A1* | 6/2018 | Yoshino | B05B 13/0292 |
| 2019/0054587 A1* | 2/2019 | Wahren | B65G 43/10 |

FOREIGN PATENT DOCUMENTS

| | | |
|---|---|---|
| EP | 2998077 A2 | 3/2016 |
| WO | 2013105900 A1 | 7/2013 |

OTHER PUBLICATIONS

Robotek, "Robotic Gluing and Gasketing Line For Air Filter Production", Dec. 28, 2016 (Dec. 28, 2016), p. 1 pp., Retrieved from the Internet: URL:https://youtu.be/lNa0WucvrdwXP054977761 [retrieved on Sep. 25, 2017 for International Search Report].
Robotek, "Robotek 2016 Yeni", Oct. 9, 2016 (Oct. 9, 2016), Retrieved from the Internet: URL:http://www.robotek.de/upload/dosyalar/Robotek_Dispensing_Technology.pdf XP055409403 [retrieved on Oct. 3, 2019.
Written Opinion of the ISA for corresponding PCT/TR2017/050002.

\* cited by examiner

ROBOTIC PRODUCTION LINE AND METHODS OF FLEXIBLE AND CHAOTIC PRODUCTION

TECHNICAL FIELD

The invention relates to a robotic production line developed in order to provide that glue dispensing, gasket dispensing, potting, weighing, assembling, marking, quality control tasks for production of workpieces having different types and sizes as well as workpieces required to be processed with different combinations of tasks are performed in a compact robotic production line capable of flexible and chaotic production. The robotic production line brings significant advantages such as lower labour and production costs, shorter cycle time, improved quality and reliability, smaller production space, less raw material consumption, less production waste, lower number of defected products and increased safety comparing to conventional manual or semi-automatic production systems.

BACKGROUND OF THE INVENTION

Manufacturers must continually improve operations to achieve maximum efficiency and sustainable revenue growth. Meeting customer demands for better, faster, and higher-quality products all with the aim of lowering manufacturing costs is an important factor.

Production of a workpiece may include the following tasks; glue dispensing, gasket dispensing, potting, weighing, assembling, marking, quality control and handling of workpieces for picking, placing and rotating. Manual and semi-automatic operation of these tasks relies on operator performance to achieve a certain accuracy, consistency, repeatability and speed which is difficult to be ensured in repetitive work cycles. Semi-automatic or manual operations may cause longer cycle time, set-up time and longer adaptation time requirement for workers during product type change, and error in dispensing trajectory tracking, irregularity in dosing quantity which leads to quality and reliability problems, increased material waste and higher number of defected products which results in lower production efficiency. Exposure to chemicals, handling heavy products and man-machine interaction increases safety risks. For example, in case of manual glue dispensing and potting applications, an insufficient amount of glue or potting material cause quality problems of bonding or sealing and besides an excessive amount of glue or potting material to guarantee bonding or sealing of workpieces increases the manufacturing cost.

Global competitive environment forces manufacturers reduce their costs with a greater production volume. Reducing factory floor usage with compact and multi-functional operating systems and continuous operation create capacity for new business. Multi-shift operation is a preferred method to increase the production rate with continuous operation. However, labour-intense multiple-shift operations cause difficulties such as the fatigue and disconnection because of the fact that the personnel changes in every shift. This significantly increases the risk of incidents and operational problems such as lower throughput, poor communication and higher levels of waste.

Manufacturing many different kinds of products which appeal to diversified sectors is getting more important in today's business. In some fields of industry, small batch production capability may bring competitive advantage but with a challenge of set-up time required between batches.

BRIEF DESCRIPTION OF THE INVENTION

The main purpose of the invention is to provide that glue dispensing, gasket dispensing, potting, weighing, assembling, marking, quality control tasks for production of workpieces having different types and sizes as well as workpieces required to be processed with different combinations of tasks are performed in a compact robotic production line capable of flexible and chaotic production. The robotic production line brings significant advantages such as lower labour and production costs, shorter cycle time, improved quality and reliability, smaller production space, less raw material consumption, less production waste, lower number of defected products and increased safety comparing to conventional manual or semi-automatic production systems.

Workpieces of different types and sizes as well as workpieces required to be processed with different combinations of tasks are processed in the robotic production line allowing so-called flexible production. Workpieces of different types and sizes as well as workpieces required to be processed with different combinations of tasks are fed randomly to the robotic production line and processed on the same process conveyors in the same production cycle allowing so-called chaotic production as depicted in FIG. 11. The present invention allows mixed and small batch production which comes from the flexible and chaotic production capability.

The structural and characteristic features of the invention and all of its advantages shall be understood better with the figures and the detailed description given below in reference to the figures, and therefore, the assessment should be made by taking into account the said figures and detailed explanations.

REFERENCE NUMBERS

Figure 1:
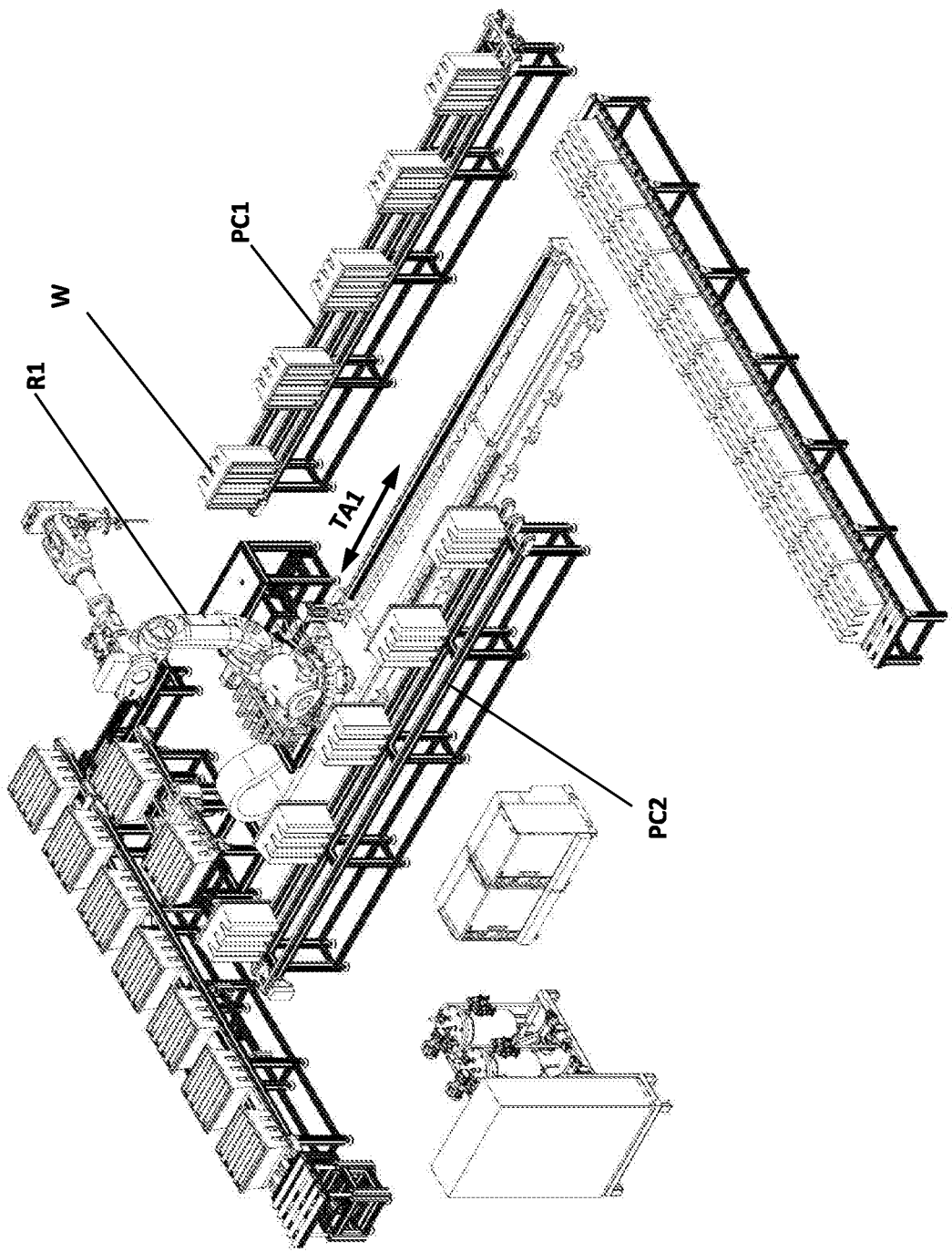
FIG. 1 is an illustration of depicting an overall configuration of one robot (R1) and two process conveyors (PC1) and (PC2)

RPL Robotic production line
R1, R2 and R3 Robots
RC1 and RC2 Robot controllers
SC System controller
WIS Workpiece identification system
TU Linear travelling unit
TA1 and TA2 Traveling axes
PC1, PC2, PC3, PC4, PC5 and PC6 Process conveyors
W Workpiece
WS Working station
FWS First working station
PFU Raw material preparation and feeding unit
CS1 and CS2 Cleaning stations
US Unloading system
EE1 and EE2 Multi-purpose end effectors
CD Conveying direction of the robotic production line
FS Feeding system
FC Conveyance direction of the workpiece feeding
ICC Interconnection conveyor
MWLS Manual workpiece loading station
AC Accumulation conveyor
SC Shuttle conveyor
TC Transfer conveyor
WPC Workpiece positioning conveyor
UP Unloading position
RP Robot position
TP1 and TP2 Transferring positions

DETAILED DESCRIPTION

The required tasks associated with production of a workpiece (W) may include one or combinations of any tasks such as glue dispensing, gasket dispensing, potting, weighing, assembling, marking, quality control. The robotic production line (RPL) may have any desired configuration, so as to execute the required tasks for production of a workpiece (W). The fundamental units of the present invention are one or a plurality of robots having a mechanical configuration of an articulated robot, a plurality of process conveyors, one or a plurality of robot controllers, a system controller (SC), a feeding system (FS), a workpiece identification system (WIS), a linear travelling unit (TU) on which one or a plurality of robots travel by means of a travel axis for each robot, an unloading system (US), one or a plurality of multi-purpose end effectors and additional subsystems. Depending on the task requirements, a combination of the additional subsystems are added to the overall configuration, such as raw material preparation and feeding units (PFU), cleaning stations, quality control stations, vacuum generators, machine vision systems, laser measurement systems for correcting the position and orientation of the workpieces (W), inspection systems and safety systems.

One or a plurality of recipes for processing workpieces (W) of different types and sizes as well as workpieces (W) required to be processed with different combinations of tasks are programmed and stored in the system controller (SC). The recipes are composed of workpiece (W) transferring to and unloading from the process conveyors, conveying workpieces (W) between the process conveyors, one or combinations of the following tasks glue dispensing, gasket dispensing, potting, weighing, assembling, marking, quality control and handling of workpieces (W) for picking, placing and rotating.

The number and the type of the tasks assigned to the robots for production of a workpiece (W); the number of the robots; the number and the length of the process conveyors; the length of the linear travelling unit (TU) may have any desired configuration so long as to accomplish the required tasks with a targeted production rate.

Figure 4:
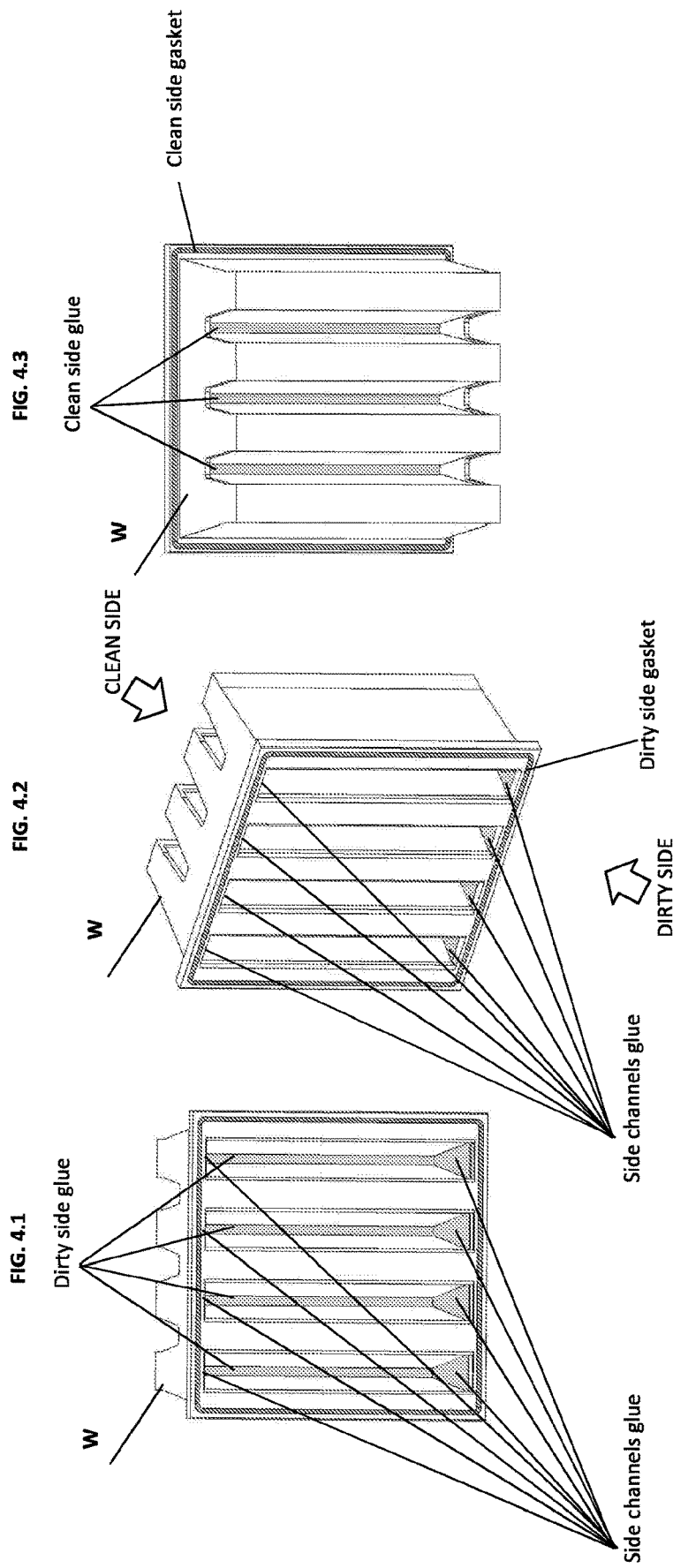
FIG. 4 is an illustration of depicting a workpiece (W) as in the form of V-Filter having dirty and clean side glue, side channels glue, clean and dirty side gaskets

Some embodiments of the present invention are listed below for workpieces (W) as in the form of V-Filters, as depicted in FIG. 4 and hereinafter referred simply to as a workpiece (W), for which the required tasks to be performed may include any combination of the following tasks; glue dispensing for two side channels, glue dispensing for clean and dirty sides, gasket dispensing for clean and dirty sides, and quality control.

Some embodiments of the present invention are described below, in detail, with reference to the accompanying drawings. In the drawings, same or similar components are denoted by common reference numerals.

One robot (R1) and two process conveyors (PC1) and (PC2), as depicted in FIG. 1, for execution of two tasks which are glue dispensing for two side channels, as depicted in FIG. 4.1 and FIG. 4.2

Figure 2:
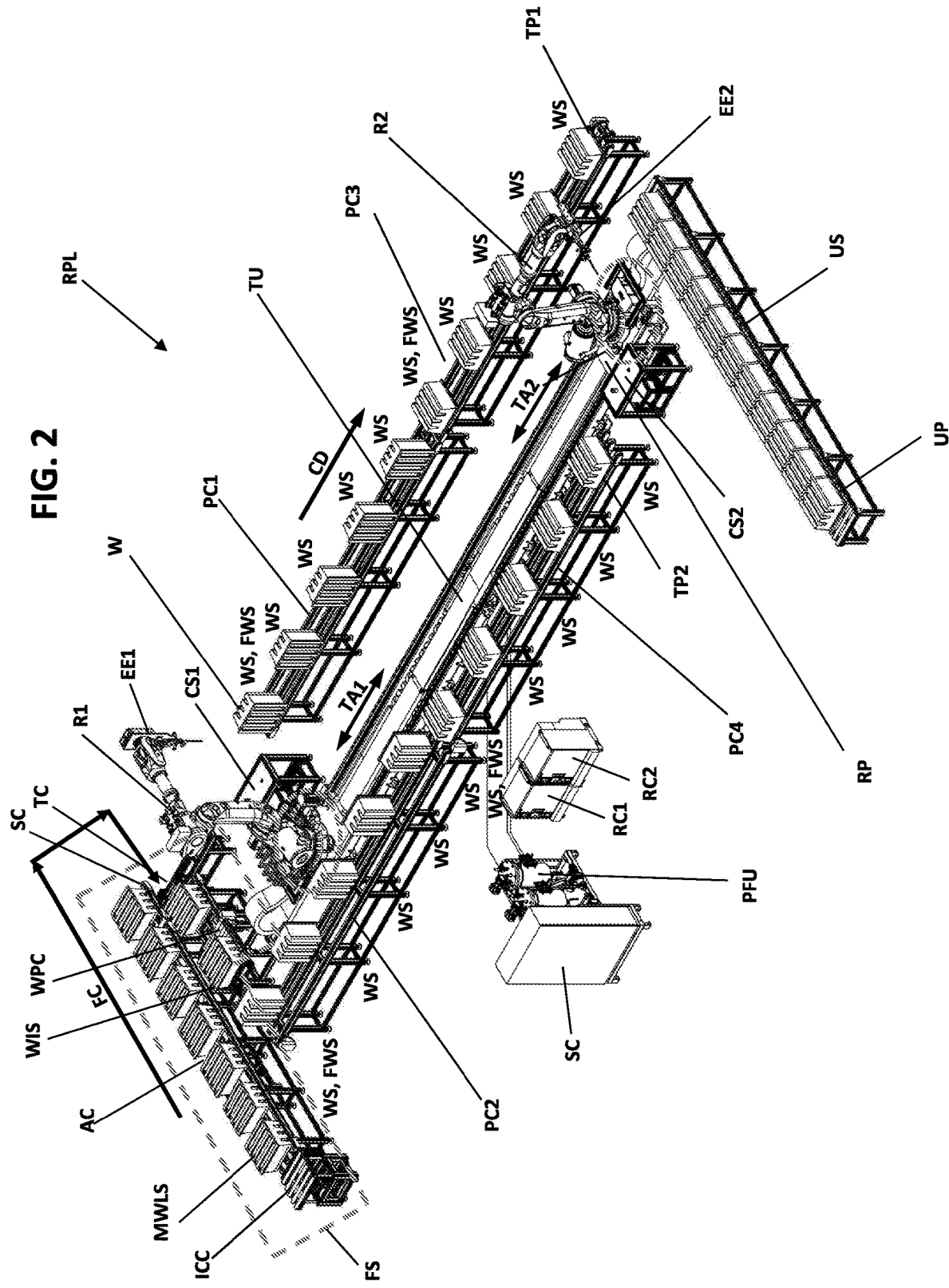
FIG. 2 is an illustration of depicting an overall configuration of two robots (R1), (R2) and four process conveyors (PC1), (PC2), (PC3), (PC4)

One robot (R1) and two process conveyors (PC1) and (PC2), as depicted in FIG. 2, for three tasks which are glue dispensing for two side channels, as depicted in FIG. 4.1 and FIG. 4.2, and gasket dispensing for clean side, as depicted in FIG. 4.3

Two robots (R1) and (R2) and four process conveyors (PC1), (PC2), (PC3) and (PC4), as depicted in FIG. 2, for four tasks; the first robot (R1) for glue dispensing for two side channels, as depicted in FIG. 4.1 and FIG. 4.2, the second robot (R2) for gasket dispensing for dirty and clean sides, as depicted in FIG. 4.2 and FIG. 4.3.

Two robots (R1) and (R2) and four process conveyors (PC1), (PC2), (PC3) and (PC4), as depicted in FIG. 2, for four tasks; the first robot (R1) for glue dispensing for two side channels, as depicted in FIG. 4.1 and FIG. 4.2, and the second robot (R2) for glue dispensing for dirty and clean sides, as depicted in FIG. 4.1 and FIG. 4.3.

Figure 3:
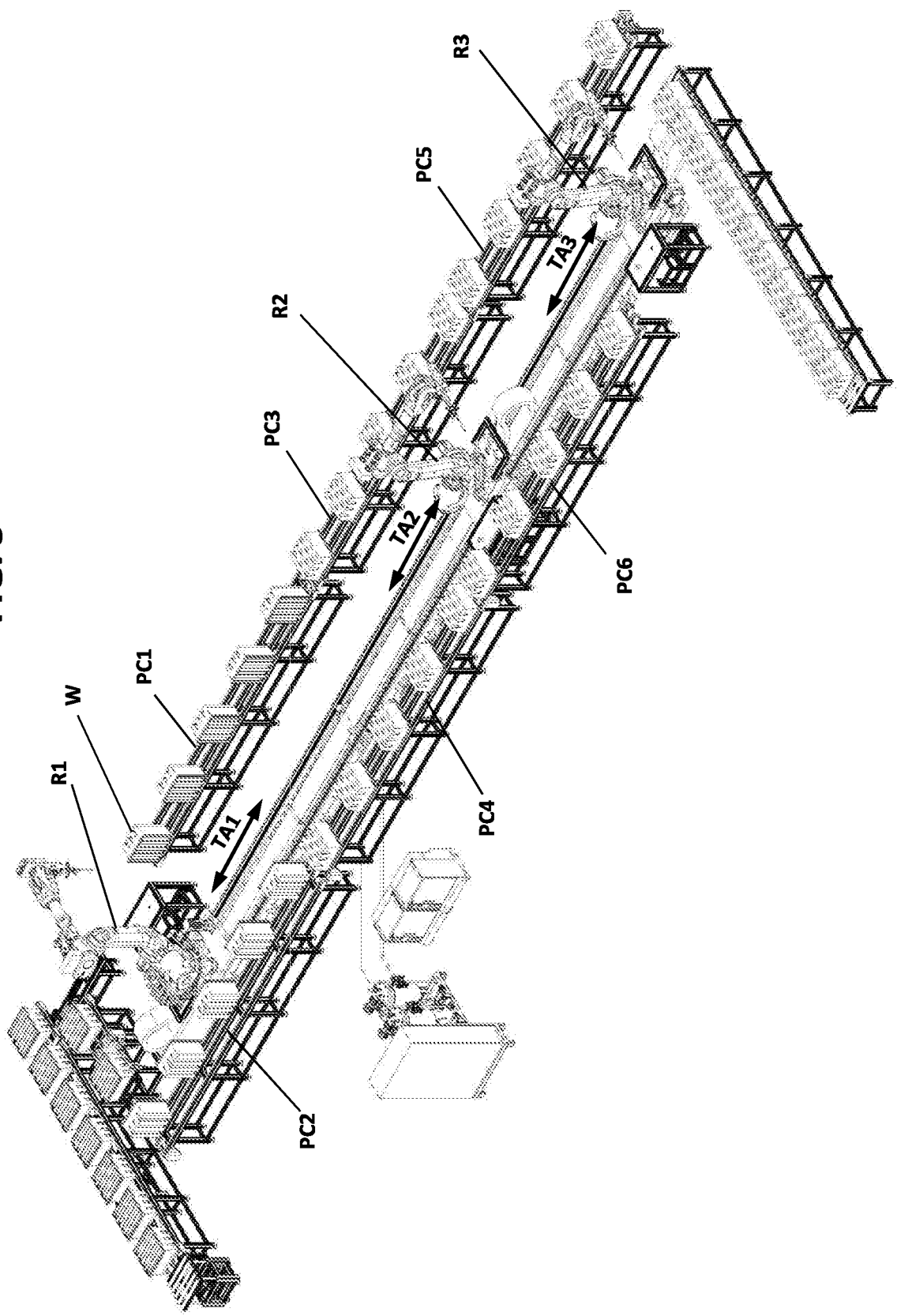
FIG. 3 is an illustration of depicting an overall configuration of three robots (R1), (R2), (R3) and six process conveyors (PC1), (PC2), (PC3), (PC4), (PC5) and (PC6)

Three robots (R1), (R2) and (R3) and six process conveyors (PC1), (PC2), (PC3), (PC4), (PC5) and (PC6), as depicted in FIG. 3, for six tasks; the first robot (R1) for glue dispensing for two side channels, as depicted in FIG. 4.1 and FIG. 4.2, the second robot (R2) for glue dispensing for dirty and clean sides, as depicted in FIG. 4.1 and FIG. 4.3, the third robot (R3) for gasket dispensing for dirty and clean sides, as depicted in FIG. 4.2 and FIG. 4.3.

Three robots (R1), (R2) and (R3) and six process conveyors (PC1), (PC2), (PC3), (PC4), (PC5) and (PC6), as depicted in FIG. 3, for five tasks; the first robot (R1) for glue dispensing for two side channels, as depicted in FIG. 4.1 and FIG. 4.2, the second robot (R2) for gasket dispensing for dirty and clean sides, as depicted in FIG. 4.2 and FIG. 4.3, the third robot (R3) for quality control.

Three robots (R1), (R2) and (R3) and six process conveyors (PC1), (PC2), (PC3), (PC4), (PC5) and (PC6), as depicted in FIG. 3, for three tasks; the first robot (R1) for glue dispensing for one side channel, as depicted in FIG. 4.1 and FIG. 4.2, the second robot (R2) for glue dispensing for the other side channel, as depicted in FIG. 4.1 and FIG. 4.2, the third robot (R3) for quality control.

First, an overall configuration of the robotic production line (RPL) as depicted in FIG. 2, to which a robotic production line according to one embodiment of the present invention is applied, will be described with reference to FIG. 2.

Referring to FIG. 2, robotic production line (RPL) comprises of a plurality of the robots (R1) and (R2) having a mechanical configuration of an articulated robot; a plurality of the process conveyors (PC1), (PC2), (PC3) and (PC4); a plurality of the robot controllers (RC1) and (RC2); and the system controller (SC); the feeding system (FS); the workpiece identification system (WIS), the linear travelling unit (TU); unloading system (US); and multi-purpose end effectors (EE1) and (EE2); the additional subsystems of the raw material preparation and feeding unit (PFU) and the cleaning stations (CS1) and (CS2).

The workpiece identification system (WIS) is configured so that the workpieces (W) are identified by means of such as one or the combinations of a barcode reader, machine vision and sensors and associated with their recipes before the workpieces (W) are positioned on the workpiece positioning conveyor (WPC).

The feeding system (FS) may have any desired configuration so long as different sizes and types of workpieces (W) can be fed to the feeding system (FS), automatically from an existing production line or automatically by means of an auxiliary loading system or manually by a human operator, wherein the workpieces (W) are transferred and positioned, in order to facilitate that the robot (R1) can pick the workpieces (W) up with a required position precision. In the embodiment depicted in FIG. 2, the feeding system (FS) includes the interconnection conveyor (ICC), the manual workpiece loading station (MWLS), the accumulation conveyor (AC), the shuttle conveyor (SC), the transfer conveyor (TC) and the workpiece positioning conveyor (WPC). The interconnection conveyor (ICC) enables integration with an existing production line or with an auxiliary loading system for the purpose of automatic workpiece (W) feeding from an existing production line or from an auxiliary loading system to the feeding system (FS). The manual workpiece loading station (MWLS) facilitates manual workpiece feeding, whereby the workpieces (W) are loaded into the feeding system (FS) manually by a human operator. The accumulation conveyor (AC) enables accumulation of workpieces (W). The shuttle conveyor (SC) is used to change the conveyance direction of the workpiece feeding (FC) by 180 degrees. The transfer conveyor (TC) is used to transfer the workpieces (W) from the shuttle conveyor (SC) to the workpiece positioning conveyor (WPC). The workpiece positioning conveyor (WPC) is used in order to facilitate that the robot (R1) can pick the workpieces (W) up with a required position precision in order to place the workpieces (W) onto the process conveyors (PC1) and (PC2).

The process conveyors (PC1), (PC2), (PC3) and (PC4) are configured so that different sizes and types of workpieces (W) can be placed on, in order to facilitate the robots (R1) and (R2) to perform their tasks as programmed in the recipe of each workpiece (W). The number and the length of the process conveyors (PC1), (PC2), (PC3) and (PC4) are determined according to the required number of the working stations (WS), the sizes of workpieces (W) and the process requirements. In the embodiment depicted in FIG. 2, four process conveyors (PC1), (PC2), (PC3) and (PC4), and five working stations (WS) for each process conveyors (PC1), (PC2), (PC3) and (PC4) are configured. The robots (R1) and (R2) start to perform the tasks from the first working stations (FWS) of the process conveyors (PC1), (PC2), (PC3) and (PC4) in the conveying direction of the robotic production line (CD).

The unloading system (US) is configured so that different sizes and types of workpieces (W) can be placed on by the robot (R2), in order to move the workpieces (W) to the unloading position (UP), as depicted in FIG. 2. The workpieces (W) can be unloaded from the unloading position (UP), as depicted in FIG. 2, manually by a human operator or automatically by an auxiliary system or automatically conveyed by the unloading system to an existing line.

As depicted in FIG. 2, the linear traveling unit (TU), which consists of a plurality of the traveling axes (TA1) and (TA2) for the robots respectively (R1) and (R2), is installed between the process conveyors (PC1), (PC2), (PC3) and (PC4). The robots (R1) and (R2) travel on the traveling unit (TU) to perform their tasks as programmed in the recipe of each workpiece (W) on each working station (WS) of the process conveyors (PC1), (PC2), (PC3) and (PC4). The length of the linear travelling unit (TU) is determined based on the length of the process conveyors and the position of the feeding system (FS) and the unloading system (US). The number of traveling axes, such as (TA1) and (TA2) are determined according to the number of the robots. In the embodiment depicted in FIG. 2, two travelling axes (TA1) and (TA2) for the robots respectively (R1) and (R2) are configured.

The multi-purpose end effectors (EE1) and (EE2) are attached respectively to the wrists of the robots (R1) and (R2) and adapted for being manipulated by the robots allowing the robots to perform their tasks as programmed in the recipe of each workpiece (W). The mechanical configuration of the end-effectors (EE1) and (EE2) may have any desired configuration so long as the robots can perform their tasks as programmed in the recipe of each workpiece (W).

In the embodiment depicted in FIG. 2, there is a raw material preparation and feeding unit (PFU) which may have any desired configuration so long as the robots (R1) and (R2) can perform the assigned tasks associated with the workpieces (W) such as glue and gasket dispensing tasks.

In the embodiment depicted in FIG. 2, there are two cleaning stations (CS1) and (CS2) on which flushing, pre-dispensing, sample dispensing and calibration of multi-purpose end-effectors respectively (EE1) and (EE2), which may be necessary for gasket and glue dispensing tasks, are executed.

Referring to FIG. 2, the robotic production line (RPL) includes the robot controllers (RC1) and (RC2) for controlling respectively the robots (R1), (R2) and the linear travelling unit (TU).

The system controller (SC) is used to store the recipes and to control the feeding system (FS), the process conveyors (PC1), (PC2), (PC3) and (PC4) and the unloading system (US), the workpiece identification system (WIS), the raw material preparation and feeding unit (PFU), the multi-purpose end-effectors (EE1) and (EE2), the process flow and the following additional subsystems: the raw material preparation and feeding unit (PFU), the cleaning stations (CS1) and (CS2).

Description of Process

A recipe for processing of each type and size of workpieces (W) is programmed and stored in the system controller (SC). The recipe is composed of workpiece (W) transferring to the process conveyors (PC1) and (PC2), workpiece (W) unloading from the process conveyors (PC3) and (PC4), conveying workpieces (W) between the process conveyors (PC1), (PC2), (PC3) and (PC4) and the following tasks: the tasks assigned to the robot (R1) including glue dispensing for two side channels, as depicted in FIG. 4.1 and FIG. 4.2, and workpiece (W) handling of picking, placing and rotating; the tasks assigned to the robot (R2) including gasket dispensing for dirty and clean sides, as depicted in FIG. 4.2 and FIG. 4.3, and workpiece handling of picking and placing and rotating.

The workpieces (W), which are fed to the feeding system (FS) automatically from an existing production line or by means of an auxiliary loading system or manually by a human operator, are accumulated and then positioned one by one on the workpiece positioning conveyor (WPC), wherein the workpieces (W) are identified by means of the workpiece identification system (WIS).

The robot (R1) travels on the traveling unit (TU), picks the workpieces (W) from the workpiece positioning conveyor (WPC) one by one by using the end-effector (EE1), and then places the workpieces (W) onto the first working station (FWS) of the process conveyors (PC1), in a way so that one of the side channels of the workpiece (W), as depicted in Figure FIG. 4.2, is down on the process conveyors (PC1). The process conveyor (PC1) moves the workpiece (W) from the first working station (FWS) to the next working station (WS) in the conveying direction of the robotic production line (CD) emptying the first working station (FWS) in order to allow the robot (R1) to place another workpiece onto the first working station (FWS) of the process conveyor (PC1). This process is repeated until the fed workpieces (W) are finished or all working stations (WS) of the process conveyors (PC1) are full. If there are more workpieces (W) fed from the feeding system (FS) the robot (R1) picks the workpieces (W) from the workpiece positioning conveyor (WPC) one by one by using the end-effector (EE1), and then places the workpieces (W) onto the first working station (FWS) of the process conveyors (PC2), in a way so that one of the side channels of the workpiece (W), as depicted in Figure FIG. 4.2, is down on the process conveyors (PC2). The process conveyor (PC2) moves the workpiece (W) from the first working station (FWS) to the next working station (WS) in the conveying direction of the robotic production line (CD) emptying the first working station (FWS) in order to allow the robot (R1) to place another workpiece onto the first working station (FWS) of the process conveyor (PC2). This process is repeated until the fed workpieces (W) are finished or all working stations (WS) of the process conveyors (PC2) are full.

The robot (R1) does pre-dispensing at the cleaning station (CS1) and then the robot (R1) travels on the linear travelling unit (TU) and get positioned for the workpiece (W) at the first working station (FWS) of the process conveyor (PC1), in order to dispense glue on to the first side channels of the workpiece (W), as depicted in FIG. 4.2. The robot (R1) repeats the glue dispensing task one by one for the other workpieces (W) which are on the other working stations (WS) of process conveyors (PC1) and (PC2). After completion of glue dispensing task on to the first side channels of workpieces (W) on the process conveyors (PC1) and (PC2), the robot (R1) travels to the cleaning station (CS1) and then does flushing. After flushing the robot (R1) gets positioned for the workpiece (W) at the first working station (FWS) of the process conveyor (PC1) in order to pick up and rotate the workpiece (W), in a way so that the other side channels of the workpiece (W) is down, as depicted in Figure FIG. 4.2, and then places the workpiece (W) back on to the same working station (WS). The robot (R1) repeats the rotation task one by one for the other workpieces (W) which are on the other working stations (WS) of the process conveyors (PC1) and (PC2).

Robot (R1) does pre-dispensing at the cleaning station (CS1) and then the robot (R1) travels on the linear travelling unit (TU) and get positioned for the workpiece (W) at the first working station (FWS) of the process conveyor (PC1), in order to dispense glue on to the second side channels of the workpiece (W), as depicted in FIG. 4.2. The robot (R1) repeats the dispensing task one by one for the other workpieces (W) which are on the other working stations (WS) of the process conveyors (PC1) and (PC2). After completion of the glue dispensing task on to the second side channels of workpieces (W) on the process conveyors (PC1) and (PC2) the workpieces (W) are moved by the process conveyors (PC1) and (PC2) to the next process conveyors (PC3) and (PC4) in the conveying direction of the robotic production line (CD). In the meantime, the robot (R1) travels to the cleaning station (CS1) to do flushing and get positioned to pick the new workpieces (W), which are fed by means of the feeding system (FS), and place the new workpieces (W) on to the process conveyors (PC1) and (PC2).

Figure 5:
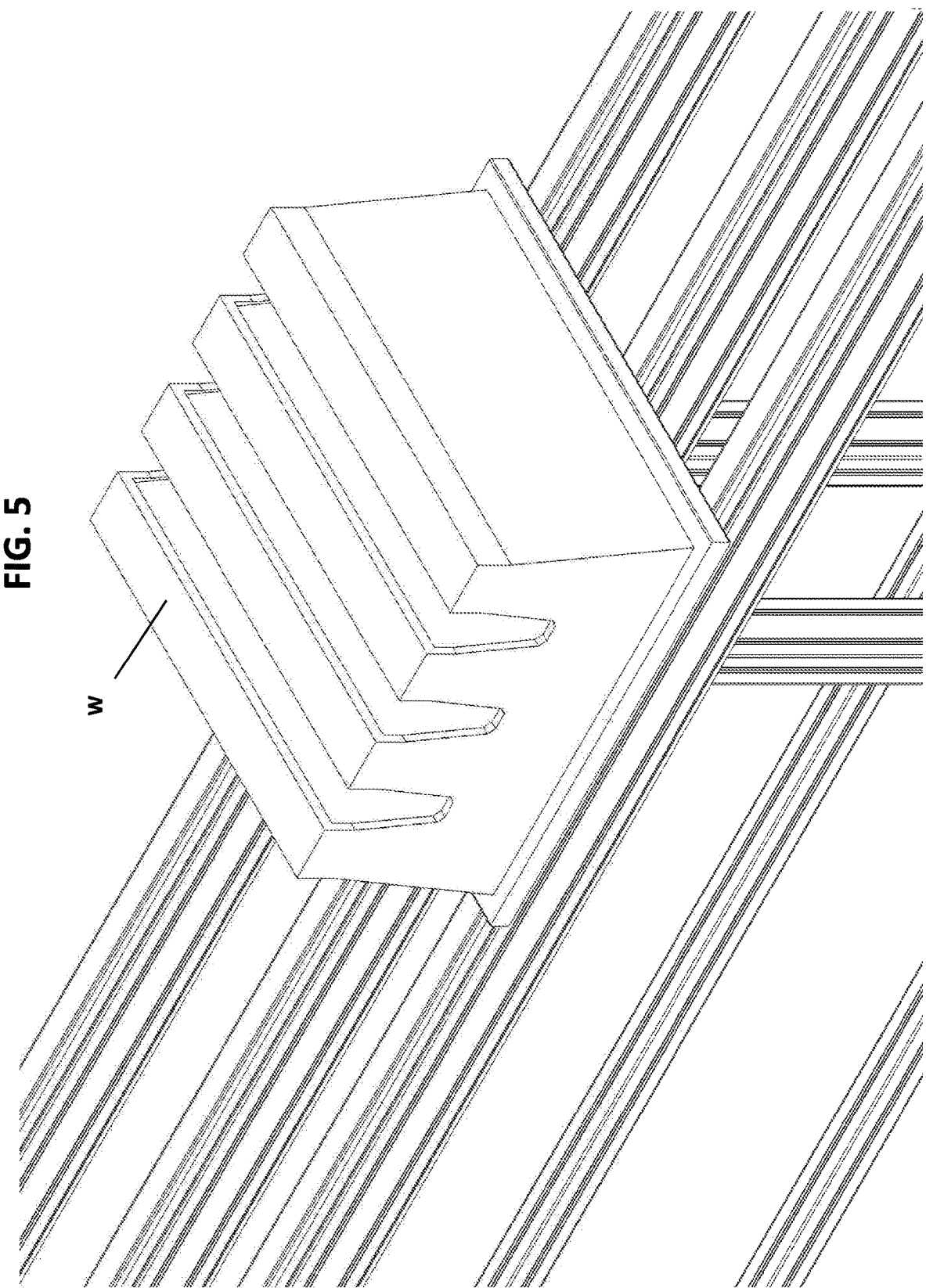
FIG. 5 is an illustration of depicting a workpiece (W) as in the form of V-Filter which is placed on a process conveyor with dirty side is down
Figure 6:
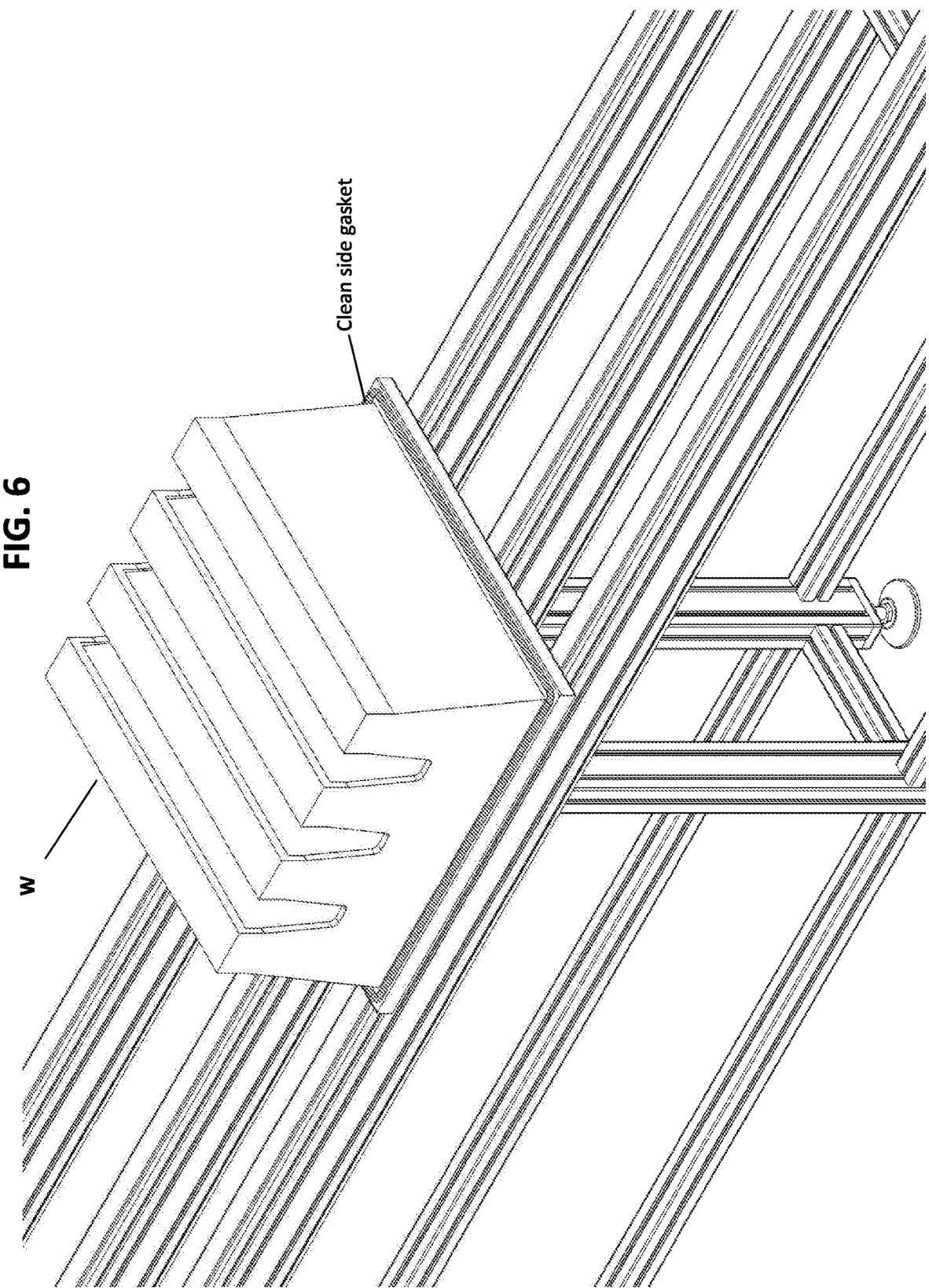
FIG. 6 is an illustration of depicting a workpiece (W) as in the form of V-Filter having a gasket on the clean side
Figure 7:
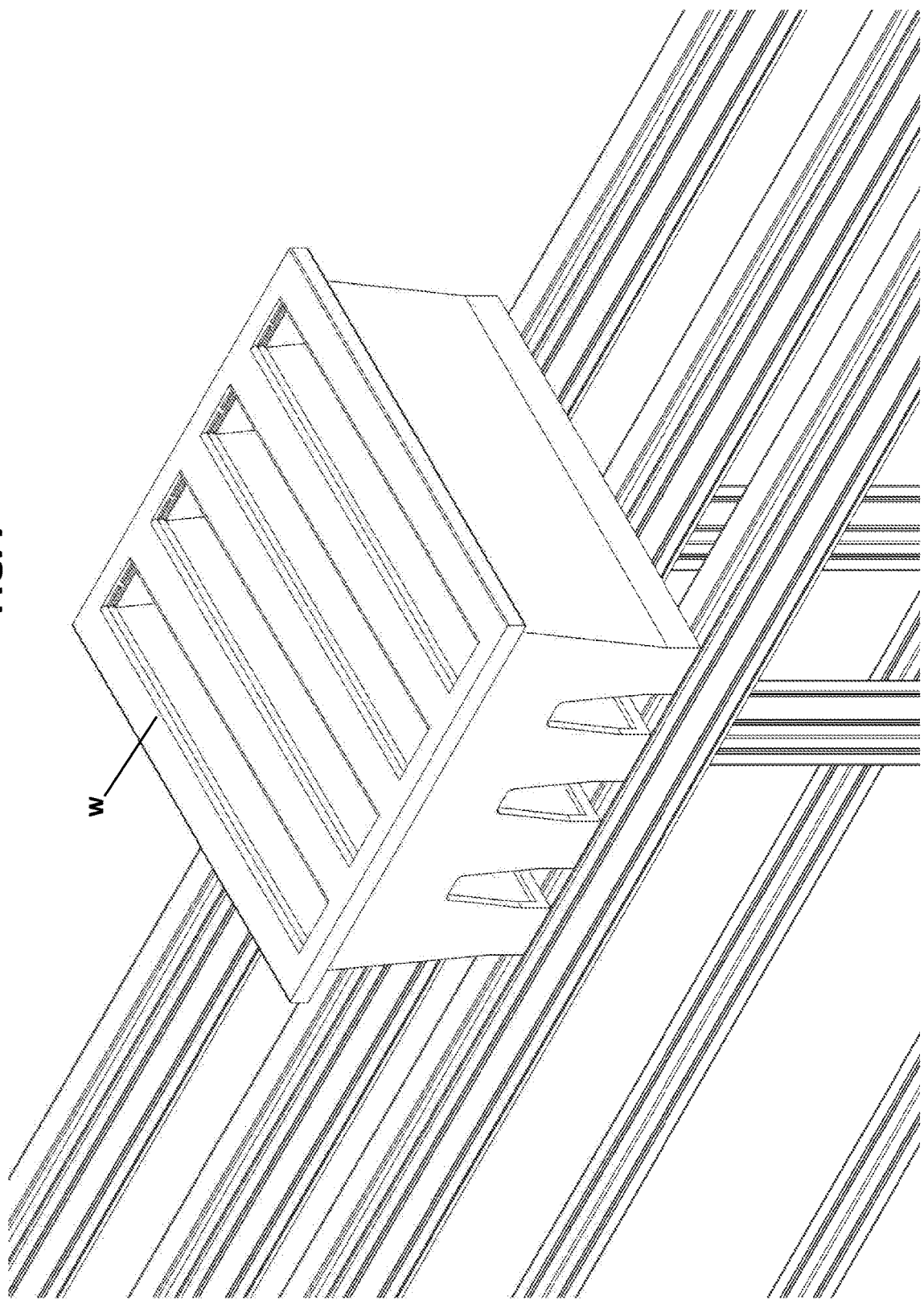
FIG. 7 is an illustration of depicting a workpiece (W) as in the form of V-Filter which is placed on a process conveyor with clean side is down
Figure 8:
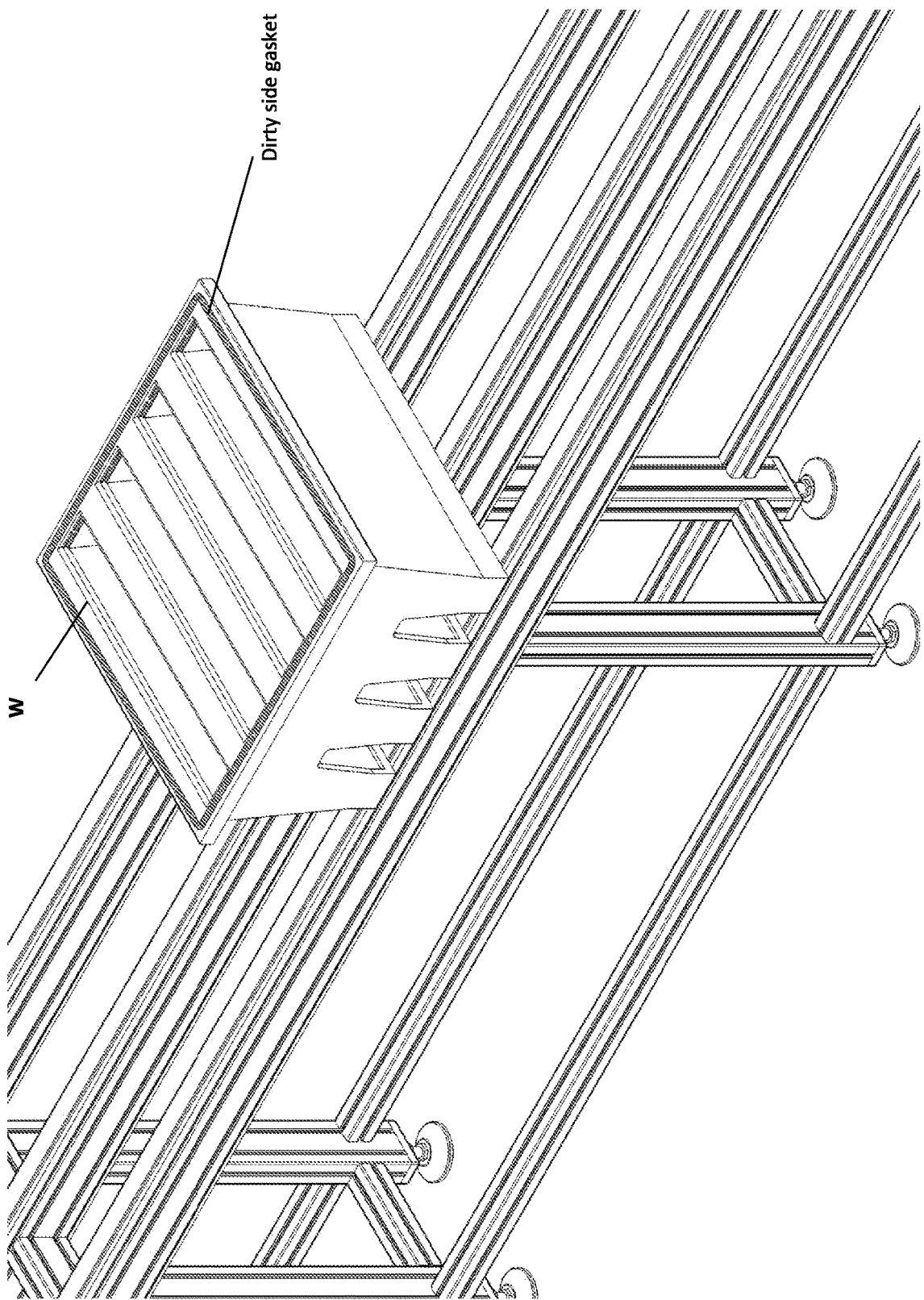
FIG. 8 is an illustration of depicting a workpiece (W) as in the form of V-Filter having a gasket on the dirty side
Figure 9:
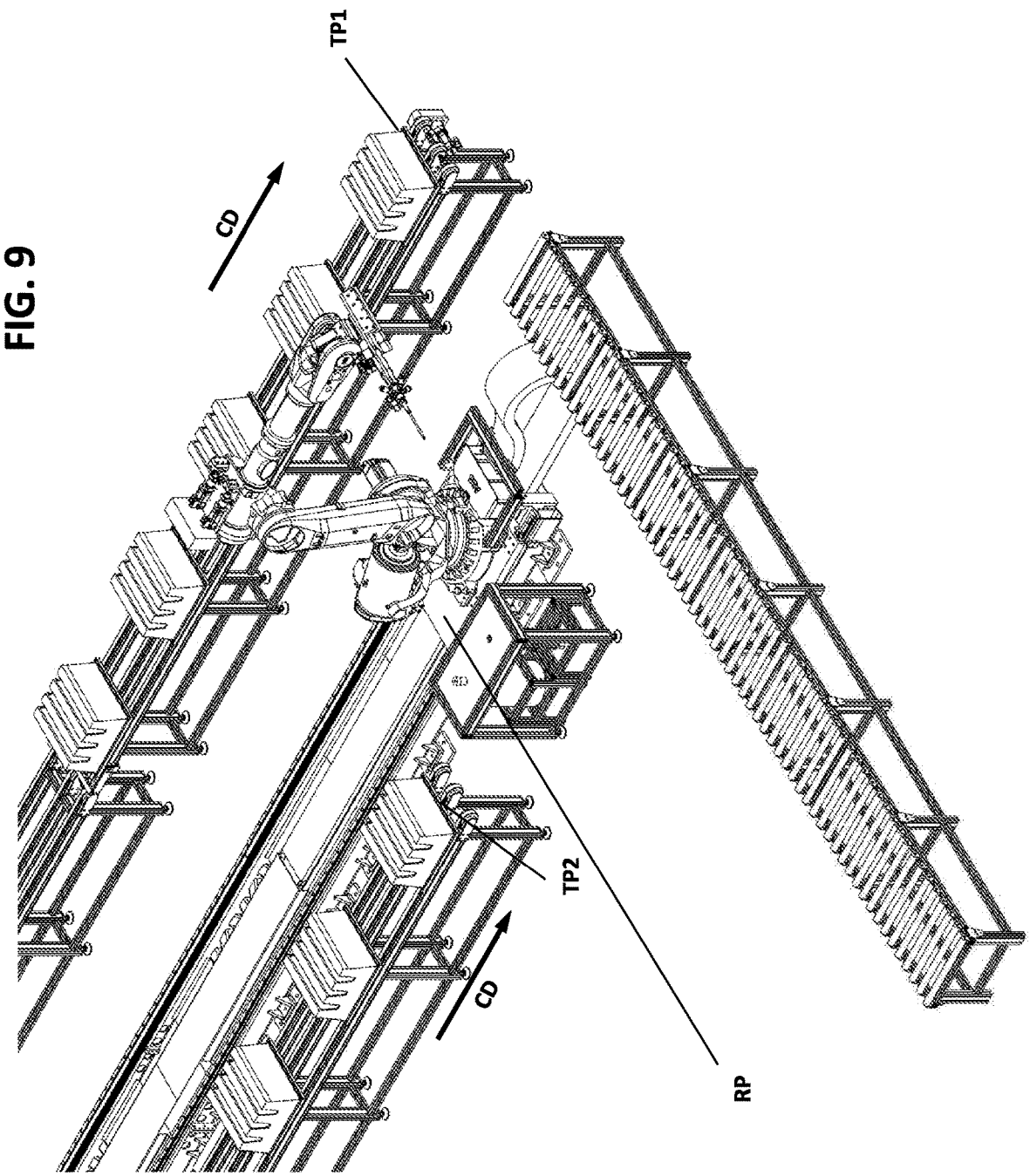
FIG. 9 is an illustration of robot (R2) positioned at robot position (RP) and V-Filters to be transferred from the process conveyors (PC3) and (PC4) onto the unloading system (US)
Figure 10:
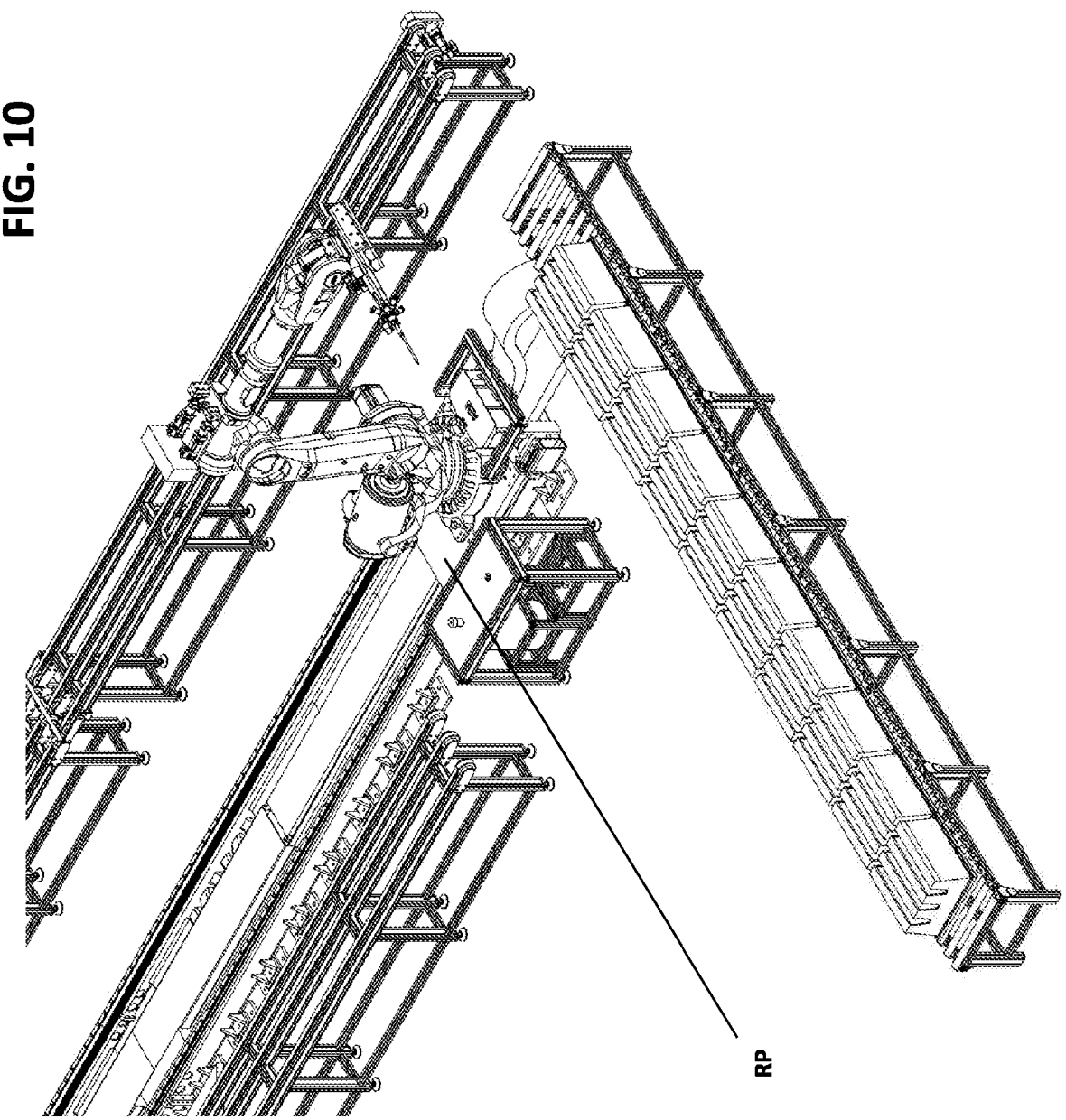
FIG. 10 is an illustration of robot (R2) positioned at robot position (RP) and V-Filters transferred onto the unloading system (US).
Figure 11:
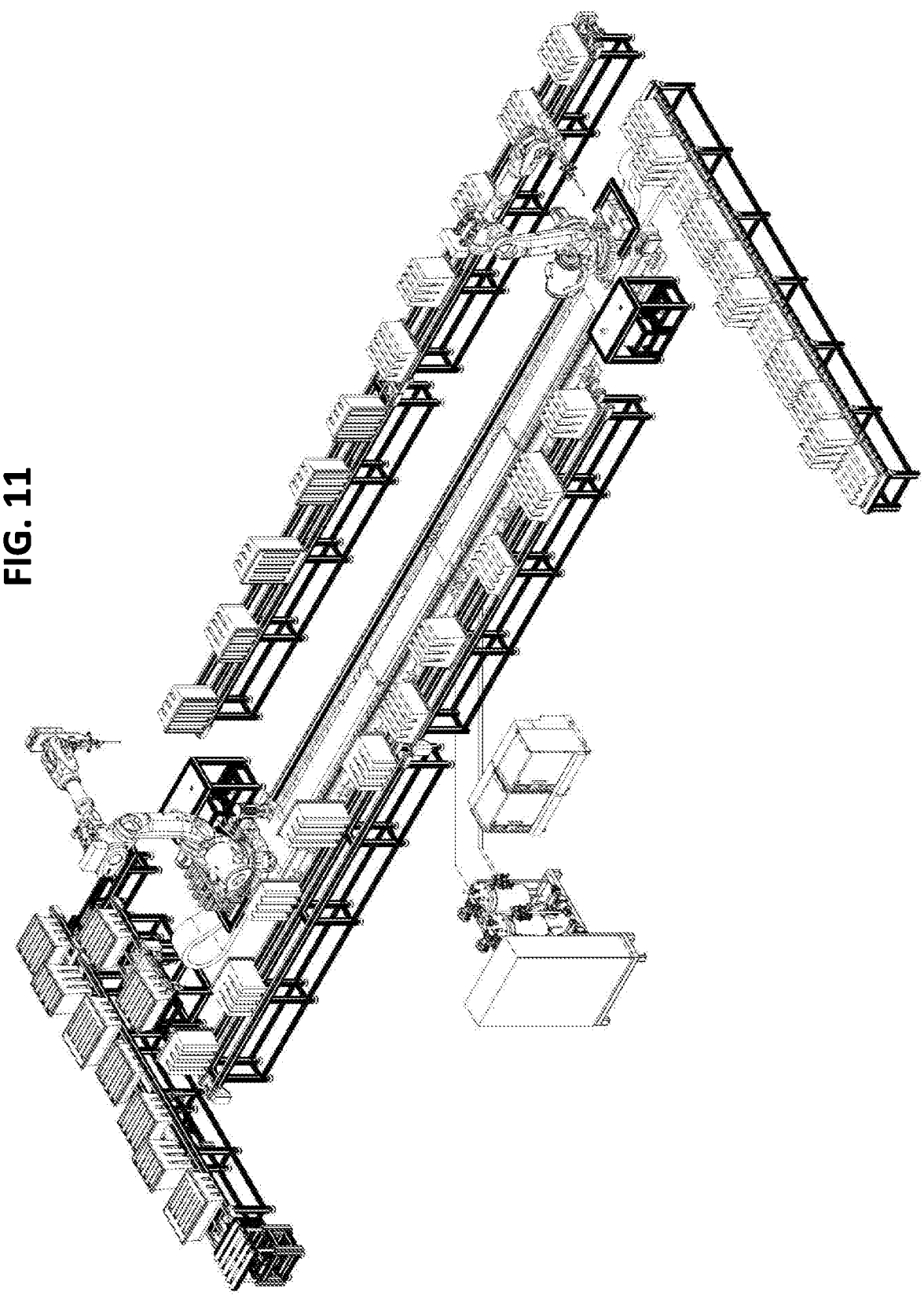
FIG. 11 is an illustration of the robotic production line (RPL) in the process of chaotic production with mixed types and sizes of workpieces (W).

After the workpieces (W) on the process conveyors (PC1) and (PC2) have been moved respectively on to the process conveyors (PC3) and (PC4) in the conveying direction of the robotic production line (CD), as depicted in the Figure FIG. 2, the robot (R2) travels on the linear travelling unit (TU) and gets positioned for the workpiece (W) at the first working station (FWS) of the process conveyor (PC3). The robot (R2) picks up and rotates the workpiece (W) in a way so that the dirty side of the workpiece (W) is down and then places the workpiece (W) back on to the same working station (WS) as depicted in FIG. 5. The robot (R2) repeats the rotation task one by one for the other workpieces (W) which are on the other working stations (WS) of process conveyors (PC3) and (PC4). The robot (R2) does pre-dispensing at the cleaning station (CS2) and then the robot (R2) travels on the linear travelling unit (TU) and gets positioned for the workpiece (W) at the first working station (FWS) of the process conveyor (PC3), in order to dispense gasket on to the clean side of the workpiece (W), as depicted in FIG. 6. The robot (R2) repeats the gasket dispensing task one by one for the other workpieces (W) which are on the other working stations (WS) of the process conveyors (PC3) and (PC4). After completion of gasket dispensing on to the clean side of the workpieces (W) on the process conveyors (PC3) and (PC4) the robot (R2) travels to the cleaning station (CS2) and then does flushing. After flushing the robot (R2) gets positioned for the workpiece (W) at the first working station (FWS) of the process conveyor (PC3) in order to pick up and rotate the workpiece (W) in a way so that the clean side is down and then places the workpiece (W) back on to the same working station (WS), as depicted in FIG. 7. The robot (R2) repeats the rotation task one by one for the other workpieces (W) which are on the other working stations (WS) of the process conveyors (PC3) and (PC4). The robot (R2) does pre-dispensing at the cleaning station (CS2) and then the robot (R2) travels on the linear travelling unit (TU) and gets positioned for the workpiece (W) at the first working station (FWS) of the process conveyor (PC3), in order to dispense gasket on to the dirty side of the workpiece (W), as depicted in FIG. 8. The robot (R2) repeats the dispensing task one by one for the other workpieces (W) which are on the other working stations (WS) of the process conveyors (PC3) and (PC4). After completion of gasket dispensing on to dirty side of the workpieces (W) on the process conveyors (PC3) and (PC4) the robot (R2) travels on the traveling unit (TU) and gets positioned at the robot position (RP) then picks up the workpiece (W) from the transferring position (TP1) and places the workpiece (W) onto the unloading system (US). After the robot (R2) picks the workpiece (W) up from the transferring position (TP1), the process conveyor (PC3) moves the next workpiece (W) to the transferring position (TP1) in the conveying direction of the robotic production line (CD), as depicted in FIG. 9. Workpiece (W) unloading onto the unloading system (US) is repeated until all the workpieces (W) on the process conveyor (PC3) are unloaded and then the robot (R2) starts to unload the workpieces (W) from the process conveyor (PC4). After the robot (R2) picks the workpiece (W) up from the transferring position (TP2), the process conveyor (PC4) moves the next workpiece (W) to the transferring position (TP2) in the conveying direction of the robotic production line (CD), as depicted in FIG. 9. Workpiece (W) unloading onto the unloading system (US) is repeated until all the workpieces (W) on the process conveyor (PC4) are unloaded. By this way, all the workpieces (W) on the process conveyors (PC3) and (PC4) are unloaded on to the unloading system (US) as depicted in FIG. 10.

While the invention has been described with reference to specific preferred embodiments, it will be understood, by those skilled in the art, that various changes or modifications may be made thereto without departing from the scope of the claims.

The invention claimed is:

1. A robotic production line assembly comprising:
   at least one recipe programmed to process workpieces of different types and sizes and to process workpieces with different types of tasks, said at least one recipe adapted to transfer a workpiece to process conveyors and to unload the workpiece from process conveyors and to convey the workpiece between the process conveyors, the different types of tasks being selected from the group consisting of glue dispensing, gasket dispensing, potting, weighing, assembling, marking, quality controlling, handling of the workpiece for picking, placing and rotating, and combinations thereof;
   at least one articulated robot having the at least one recipe assigned thereto;
   at least one end effector attached to a wrist of said at least one articulated robot, said at least one end effector being manipulatable by said at least one articulated robot so as to allow said at least one articulated robot to perform the different types of tasks as programmed by said at least one recipe;
   a feeding system that transfers the workpiece directly to the process conveyors or to said at least one articulated robot such that said at least one articulated robot picks the workpiece from said feeding system and to places the workpiece onto the process conveyors, the feeding system being an existing production line or an auxiliary loading system whereby the workpiece is loaded from the existing production line or from the auxiliary production line onto the process conveyors;
   an unloading system adapted to allow the workpiece to be unloaded to an existing line;
   a linear traveling unit having a travel axis for said at least one articulated robot, said at least one articulated robot movable along said linear traveling unit, a length of said linear traveling unit corresponding to a length of the process conveyors and positions of said feeding system and said unloading system, wherein the process conveyors are positioned in-line and adjacent to each other in a conveying direction of the robotic production line assembly and positioned parallel to and at opposite sides of said linear traveling unit;
   a plurality of working stations positioned on each of the process conveyors, wherein the tasks performed by said at least one articulated robot correspond to a predefined position on the linear traveling unit for each working station of said plurality of working stations, said plurality of working stations positioned on one or opposite sides of said linear traveling unit, wherein the workpiece is conveyable from one of said plurality of working stations on one of the process conveyors to another of the process conveyors in the conveying directions of the robotic production line assembly;
   a workpiece identification system that identifies the workpiece and the task assigned to the workpiece;
   at least one subsystem having a unit selected from the group consisting of a raw material preparation and feeding unit, a cleaning station, a quality control station, a vacuum generator, a machine vision system, a laser measurement system for correcting position and orientation of the workpiece, an inspection system, a safety system, and combinations thereof, wherein said at least one recipe has at least one transferring position programmed therein such that the workpiece is conveyed from one of said plurality of working stations if no further tasks are to be processed for the workpiece, the workpiece being transferred from the at least one transferring position into said unloading system directly by one of the process conveyors or by said at least one articulated robot after completion the tasks for the workpiece;
   at least one robotic controller cooperative with said at least one articulated robot and said linear traveling unit; and
   a system controller that stores the at least one recipe and is cooperative with said feeding system, with the process conveyors, with said unloading system, with said workpiece identification system and with said at least one sensor with said raw material preparation and feeding unit, said cleaning station, said quality control station, said vacuum generator, said machine vision system, said laser measurement system for correcting position and orientation of the workpiece, said inspection system, said safety system.

2. The robotic production line assembly of claim 1, wherein said feeding system comprises:
   an interconnection conveyor cooperative with the existing production line or with an auxiliary loading system such that the workpiece is fed automatically to said feeding system from the existing production line or the auxiliary loading system;
   a manual workpiece loading station adapted to allow a human operator to manually load the workpiece into said feeding system;
   an accumulation conveyor adapted to accumulate the workpieces;
   a shuttle conveyor adapted to change a conveyance direction of the workpiece toward said feeding system;
   a workpiece positioning conveyor that allows adjacent at least one articulated robot to pick the workpiece from said feeding system and to place the workpiece onto at least one of the process conveyors; and
   a transfer conveyor cooperative with said shuttle conveyor and with said workpiece positioning conveyor so as to transfer the workpiece from said shuttle conveyor to said workpiece positioning conveyor.

3. The robotic production line assembly of claim 1, wherein said workpiece identification system comprises a barcode reader.

4. The robotic production line assembly of claim 1, wherein said workpiece identification system comprises a machine vision.

5. The robotic production line assembly of claim 1, wherein said workpiece identification system comprises a plurality of sensors.

6. The robotic production line assembly of claim 1, wherein said workpiece is selected from the group consisting of a V-filter, a compact air filter, a panel filter, a HEPA filter and a ULPA filter.

7. A method for operating a robotic production line, the method comprising:

programming at least one recipe for processing workpieces of different types and sizes and workpieces processed by different combinations of tasks, the at least one recipe corresponding to transferring to at least one process conveyor and unloading from the at least one process conveyor, conveying the workpiece between the process conveyors, the tasks selected from the group consisting of glue dispensing, gasket dispensing, potting, weighing, assembling, marking, quality controlling, handling of the workpiece for picking, placing and rotating, and combinations thereof, the different combinations of tasks being assigned to at least one articulated robot;

storing the recipe into a system controller, the system controller controlling a feeding system and the at least one process conveyor, an unloading system, a workpiece identification system, a process flow, and at least one subsystem, the at least one additional subsystem selected from the group consisting of raw material preparation and feeding units, cleaning stations, quality control stations, vacuum generators, machine vision systems, laser measurement systems for correcting a position and orientation of the workpiece, inspection systems, safety systems and combinations thereof;

feeding the workpiece by the feeding system, the feeding system transferring and rotating and positioning the workpiece;

loading the workpiece into the feeding system manually or automatically from an existing production line or from an auxiliary loading system;

identifying the workpiece and associating the identified workpiece with a corresponding recipe of said at least one recipe by a workpiece identification system;

transferring the workpieces from the feeding system directly to the at least one process conveyor or to the at least one articulated robot, the at least one articulated robot picking the workpiece up from the feeding system and placing the workpiece onto the at least one process conveyor, the at least two process conveyors being positioned in-line and adjacent to each other in a conveying direction of the robotic production line and positioned parallel to and at the at least one of the opposite sides of a linear traveling unit, the at least one articulated robot traveling on the linear traveling unit so as to define a travel axis of the at least one articulated robot, at least one end effector being attached to a wrist of the at least one articulated robot and being manipulatable by the at least one articulated robot so as to allow the at least one articulated robot to carry out an assigned task from the at least one recipe, the at least one articulated robot and the linear traveling unit being controlled by at least one robot controller;

processing the tasks for the workpiece, wherein the at least one articulated robot travels on the linear traveling unit to a pre-defined position of a working station and performs the tasks as programmed in the at least one recipe of the workpiece at the working station, the at least one process conveyor positioned on at least one side of the linear traveling unit;

conveying the workpiece from the working station to at least one transferring position programmed in the at least one recipe if no further tasks are to be processed for the workpiece;

transferring the workpiece from the at least one transferring position into the unloading system directly by the at least one process conveyor or by the at least one articulated robot after completion of the tasks for the workpiece; and unloading the workpiece from the unloading system manually or automatically by an auxiliary system or conveying the workpiece by the unloading system to an existing line.

* * * * *